(12) United States Patent
Liang et al.

(10) Patent No.: US 12,394,350 B2
(45) Date of Patent: Aug. 19, 2025

(54) METHOD AND DEVICE FOR GENERATING DISPLAY INFORMATION OF ELECTRONIC PRICE TAG AND MEDIUM

(71) Applicant: Hanshow Technology Co., Ltd., Xiuzhou District (CN)

(72) Inventors: Min Liang, Jiaxing (CN); Qi Jiang, Jiaxing (CN); Ruilei Ma, Jiaxing (CN); Xi Zhong, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 18/929,434

(22) Filed: Oct. 28, 2024

(65) Prior Publication Data

US 2025/0209953 A1      Jun. 26, 2025

(30) Foreign Application Priority Data

Dec. 20, 2023   (CN) .......................... 202311754054.2

(51) Int. Cl.
*G09G 3/20*         (2006.01)
*G06T 11/00*        (2006.01)
(Continued)

(52) U.S. Cl.
CPC .......... *G09G 3/2003* (2013.01); *G06T 11/001* (2013.01); *G09G 2320/0666* (2013.01)

(58) Field of Classification Search
CPC ...... G09G 3/344; G09G 3/203; G09G 3/2803; G09G 5/02; G09G 5/06; G09G 5/026;
(Continued)

(56) References Cited

U.S. PATENT DOCUMENTS

2022/0067998 A1*  3/2022  Zhuang ................... G09F 3/208

FOREIGN PATENT DOCUMENTS

CN     110211484 A    9/2019
CN     111698492 A    9/2020
(Continued)

OTHER PUBLICATIONS

Chinese Office Action for Application No. 2023117054054.2 dated Jan. 30, 2024.
(Continued)

*Primary Examiner* — Wesner Sajous
(74) *Attorney, Agent, or Firm* — MOSER TABOADA

(57) ABSTRACT

A method for generating display information of an electronic price tag includes: comparing supported colors of the electronic price tag with a display color of each pixel in each to-be-displayed region, and dividing the each to-be-displayed region into a to-be-adjusted display region and a normal display region according to a comparison result; determining a target color of each pixel from the supported colors of the electronic price tag according to a display color of the each pixel in the to-be-adjusted display region; generating a rendering result of to-be-displayed information according to the target color of the each pixel in the to-be-adjusted display region and a display color of each pixel in the normal display region, and sending the rendering result of the to-be-displayed information to the electronic price tag so that the electronic price tag displays the rendering result of the to-be-displayed information.

18 Claims, 4 Drawing Sheets

(51) Int. Cl.
    *G09G 3/34*    (2006.01)
    *G09G 5/02*    (2006.01)
    *G09G 5/30*    (2006.01)
    *H04N 1/60*    (2006.01)
    *H04N 5/57*    (2006.01)

(58) Field of Classification Search
CPC .... G09G 5/30; G09G 5/39; G09G 2320/0666; G09G 2320/0271; G09G 2320/0276; G09G 2320/023; G09G 2320/0242; G09G 2320/04; G09G 2320/06; G09G 2320/0673; G09G 2320/0693; H04N 9/64; H04N 9/69; H04N 9/73–79; H04N 1/60; H04N 1/6002; H04N 1/6008; H04N 1/6016; H04N 1/6019; H04N 1/6027; H04N 1/6041; H04N 1/6077; H04N 1/608; H04N 5/57
See application file for complete search history.

(56) References Cited

FOREIGN PATENT DOCUMENTS

| | | | |
|---|---|---|---|
| CN | 111768461 A | 10/2020 | |
| CN | 111784703 A | 10/2020 | |
| CN | 112565772 A | 3/2021 | |
| CN | 113870099 A | 12/2021 | |
| CN | 115826901 A | 3/2023 | |
| CN | 115880461 A | 3/2023 | |
| CN | 115984588 A * | 4/2023 | ............. Y02D 10/00 |
| CN | 116543712 A | 8/2023 | |
| CN | 116563570 A | 8/2023 | |
| CN | 116597789 A | 8/2023 | |
| CN | 116796785 A | 9/2023 | |
| CN | 117037724 A | 11/2023 | |
| CN | 117234450 A | 12/2023 | |
| CN | 116597789 B * | 2/2024 | ............. G09G 3/344 |
| JP | 2004264769 A | 9/2004 | |
| JP | 2005114878 A | 4/2005 | |
| JP | 2008054294 A | 3/2008 | |
| JP | 2010055600 A | 3/2010 | |
| JP | 3239120 U | 9/2022 | |
| WO | WO 2021/047383 A1 | 3/2021 | |

OTHER PUBLICATIONS

Chinese Office Action for Application No. 202311754054.2 dated Feb. 29, 2024.
Chinese Office Action for Application No. 202311754054.2 dated Mar. 12, 2024.
Sha Luo, Research of Color Image Rendering with NPR Style Based on Edge Fusion, China Academic Journal Electronic Publishing House, 2012, 5 pages, vol. 29, No. 10 http://www.cnki.net.
Japanese Office Action for application No. 2024-192589 dated Feb. 4, 2025.

\* cited by examiner

METHOD AND DEVICE FOR GENERATING DISPLAY INFORMATION OF ELECTRONIC PRICE TAG AND MEDIUM

CROSS-REFERENCE TO RELATED APPLICATION

This application claims priority to Chinese Patent Application No. 202311754054.2 filed Dec. 20, 2023, the disclosure of which is incorporated herein by reference in its entirety.

TECHNICAL FIELD

The present disclosure relates to the field of electronic price tag display technology and, for example, to a method and device for generating display information of an electronic price tag and a medium.

BACKGROUND

An electronic price tag, which is a smart tag replacing a paper price tag to display an item price and has advantages of being low-carbon, environment-friendly, energy-saving, efficient and reusable, can update contents such as item information, price and promotion campaign in real time, thereby improving item management efficiency and consumer shopping experience.

The electronic price tag is displayed by an e-ink screen, and a color supported and displayed by the electronic price tag is limited by types of colored charged particles included in a microcup. If a color in a content to be displayed by the electronic price tag is different from the color supported and displayed by the electronic price tag, situations such as display abnormality or error reporting occur.

SUMMARY

The present disclosure provides a method, apparatus and device for generating display information of an electronic price tag and a medium so that the electronic price tag can normally display the information and diversity of colors that can be simulated by the electronic price tag is enriched.

In a first aspect, the present disclosure provides a method for generating display information of an electronic price tag. The method includes the steps described below.

To-be-displayed information and supported colors of the electronic price tag are acquired, where the to-be-displayed information includes a display color of each pixel in at least one to-be-displayed region.

The supported colors of the electronic price tag are compared with the display color of each pixel in the at least one to-be-displayed region, and the at least one to-be-displayed region is divided into a to-be-adjusted display region and a normal display region according to a comparison result.

A target color of each pixel in the to-be-adjusted display region is determined from the supported colors of the electronic price tag according to a display color of the each pixel in the to-be-adjusted display region.

A rendering result of the to-be-displayed information is generated according to the target color of each pixel in the to-be-adjusted display region and a display color of each pixel in the normal display region, and the rendering result of the to-be-displayed information is sent to the electronic price tag so that the electronic price tag displays the to-be-displayed information.

In a second aspect, the present disclosure further provides an apparatus for generating display information of an electronic price tag. The apparatus includes an information acquisition module, a region division module, a target color determination module and a rendering result sending module.

The information acquisition module is configured to acquire to-be-displayed information and supported colors of the electronic price tag, where the to-be-displayed information includes a display color of each pixel in at least one to-be-displayed region.

The region division module is configured to compare the supported colors of the electronic price tag with the display color of each pixel in the at least one to-be-displayed region and divide the at least one to-be-displayed region into a to-be-adjusted display region and a normal display region according to a comparison result.

The target color determination module is configured to determine a target color of each pixel in the to-be-adjusted display region from the supported colors of the electronic price tag according to a display color of the each pixel in the to-be-adjusted display region.

The rendering result sending module is configured to generate a rendering result of the to-be-displayed information according to the target color of each pixel in the to-be-adjusted display region and a display color of each pixel in the normal display region and send the rendering result of the to-be-displayed information to the electronic price tag so that the electronic price tag displays the to-be-displayed information.

In a third aspect, embodiments of the present disclosure further provide a device for generating display information of an electronic price tag. The device includes at least one processor and a memory communicatively connected to the at least one processor.

The memory stores instructions executable by the at least one processor to cause the at least one processor to perform the method for generating display information of an electronic price tag according to any one of the embodiments of the present disclosure.

In a fourth aspect, embodiments of the present disclosure further provide a computer-readable storage medium storing computer instructions configured to, when executed, cause a processor to implement the method for generating display information of an electronic price tag according to any one of the embodiments of the present disclosure.

In a fifth aspect, embodiments of the present disclosure further provide an electronic price tag communicatively connected to the device for generating display information of an electronic price tag according to the third aspect.

The electronic price tag is configured to receive a rendering result of to-be-displayed information sent by the device for generating display information of an electronic price tag.

The electronic price tag is configured to display the rendering result of the to-be-displayed information in supported colors of the electronic price tag and/or display the rendering result of the to-be-displayed information in a mixed color consisting of the supported colors.

In a sixth aspect, embodiments of the present disclosure further provide a system for displaying an electronic price tag. The system includes the electronic price tag according to the fifth aspect and the device for generating display information of an electronic price tag according to the third aspect, where the electronic price tag is communicatively connected to the device for generating display information of an electronic price tag.

In the embodiments of the present disclosure, the to-be-displayed information and the supported colors of the electronic price tag are acquired, where the to-be-displayed information includes the display color of the each pixel in the at least one to-be-displayed region; the supported colors of the electronic price tag are compared with the display color of the each pixel in the at least one to-be-displayed region, and the at least one to-be-displayed region is divided into the to-be-adjusted display region and the normal display region according to the comparison result; the target color of the each pixel is determined from the supported colors of the electronic price tag according to the display color of the each pixel in the to-be-adjusted display region; the rendering result of the to-be-displayed information is generated according to the target color of the each pixel in the to-be-adjusted display region and the display color of the each pixel in the normal display region, and the rendering result of the to-be-displayed information is sent to the electronic price tag so that the electronic price tag displays the to-be-displayed information. In the technical solution of the embodiments of the present disclosure, the to-be-adjusted display region where the display color of the pixel is different from the supported colors of the electronic price tag is determined from the to-be-displayed region, and the display color of the each pixel in the to-be-adjusted display region is determined from target colors of the electronic price tag so that the electronic price tag can normally display the to-be-adjusted display region, thereby avoiding abnormal situations such as display abnormality or error reporting; the display color of the each pixel is changed so that the electronic price tag simulates and displays colors that are not supported by the electronic price tag by displaying the supported colors in a manner of alternating and combining the target color of the each pixel, thereby enriching the diversity of the colors that can be simulated by the electronic price tag and improving a color display effect of the electronic price tag.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate solutions of embodiments of the present disclosure more clearly, drawings used in description of embodiments of the present disclosure are described hereinafter. Apparently, these drawings illustrate part of embodiments of the present disclosure. Those of ordinary skill in the art may obtain other drawings based on these drawings on the premise that no creative work is done.

DETAILED DESCRIPTION

For a better understanding of solutions of the present disclosure by those skilled in the art, solutions in embodiments of the present disclosure are described clearly and completely hereinafter in conjunction with the drawings in embodiments of the present disclosure. Apparently, the embodiments described hereinafter are part, not all, of embodiments of the present disclosure. Based on embodiments of the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used for distinguishing between similar objects and are not necessarily used to describe a particular order or sequence. It is to be understood that the data used in this way is interchangeable where appropriate so that embodiments of the present disclosure described herein may also be implemented in a sequence not illustrated or described herein. Additionally, terms "including" and "having" or any variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

In the technical solutions of the embodiments of the present disclosure, acquisition, storage and application of the to-be-displayed information involved are in compliance with relevant laws and regulations and do not violate the public order and good customs.

Embodiment One

Figure 1:
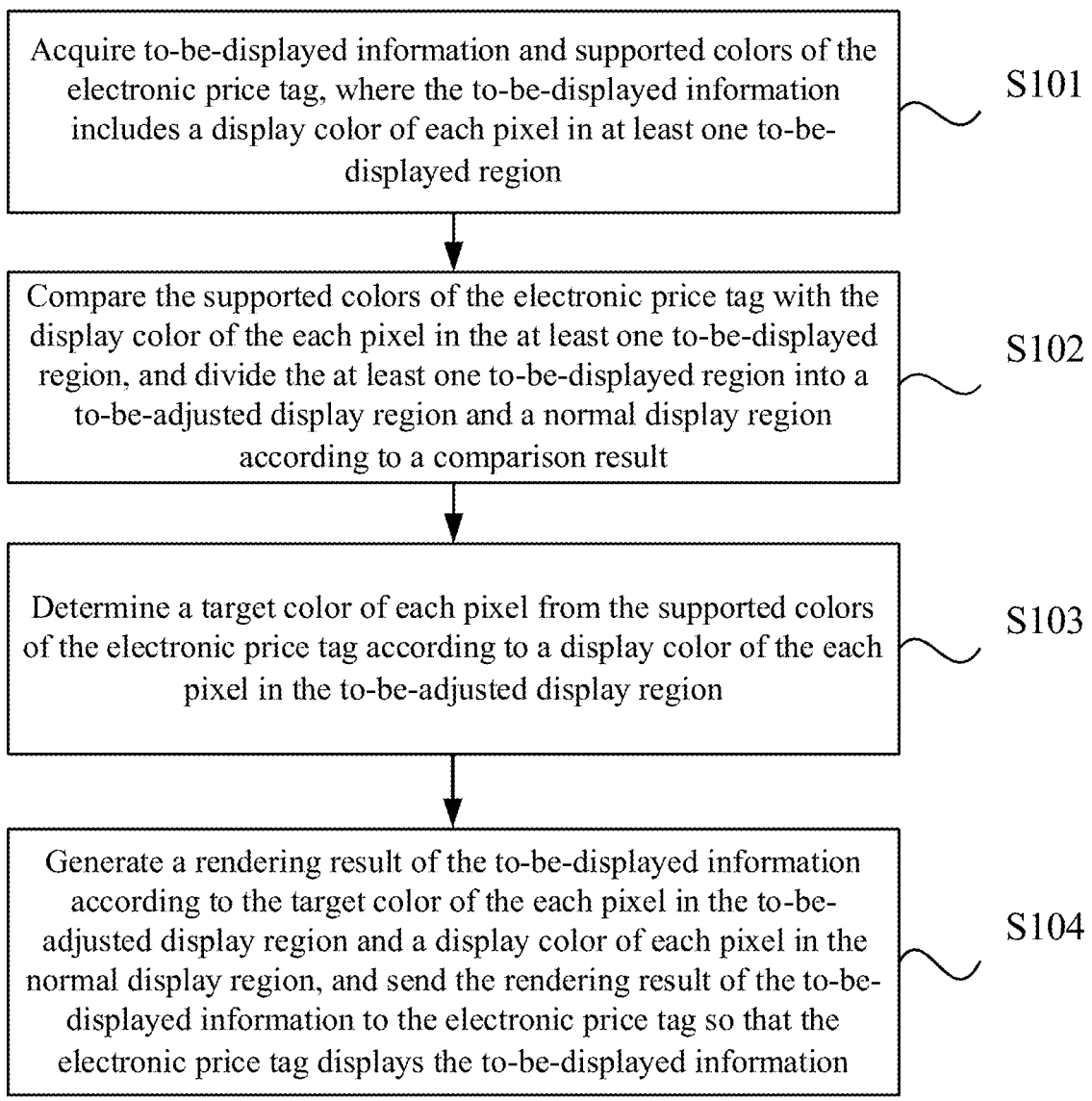
FIG. 1 is a flowchart of a method for generating display information of an electronic price tag according to embodiment one of the present disclosure.

FIG. 1 is a flowchart of a method for generating display information of an electronic price tag according to embodiment one of the present disclosure. This embodiment may be applicable to the case of displaying to-be-displayed information of the electronic price tag. The method may be performed by an apparatus for generating display information of an electronic price tag. The apparatus for generating display information of an electronic price tag may be implemented in a form of hardware and/or software and is specifically configured in a device for generating display information of an electronic price tag, for example, a server.

Referring to the method for generating display information of an electronic price tag shown in FIG. 1, the method includes the steps described below.

In S101, to-be-displayed information and supported colors of the electronic price tag are acquired, where the to-be-displayed information includes a display color of each pixel in at least one to-be-displayed region.

In this embodiment, the to-be-displayed information may be information waiting to be displayed in the electronic price tag and may include, but is not limited to, price information, item information, barcode information and two-dimensional code information. The supported color may be a color supported and displayed by the electronic price tag. The number of supported colors is at least one and is generally multiple. The to-be-displayed region may be a region for displaying the information in the electronic price tag and may include, but is not limited to, a price region, an item image region, a barcode region and a two-dimensional code region. The display color is a color of the pixel in the to-be-displayed region.

In an optional embodiment, the to-be-displayed information further includes a configuration parameter of each to-be-displayed region. The configuration parameter may include, but is not limited to, a typography parameter, a layout parameter, a size parameter, a shape parameter and a position parameter of the to-be-displayed region, a parameter of a level to which the to-be-displayed region belongs and a parameter of a page to which the to-be-displayed region belongs for performing personalized configuration on the to-be-displayed region.

In an optional embodiment, after the to-be-displayed information of the electronic price tag is acquired, the method further includes: checking whether an information format of the to-be-displayed information is a preset format and whether the to-be-displayed information is valid; and if the information format of the to-be-displayed information is not the preset format or the to-be-displayed information is invalid, generating prompt information to prompt those skilled that an error exists in the to-be-displayed information.

In S102, the supported colors of the electronic price tag are compared with the display color of the each pixel in the at least one to-be-displayed region, and the at least one to-be-displayed region is divided into a to-be-adjusted display region and a normal display region according to a comparison result.

In this embodiment, the to-be-adjusted display region may be a to-be-displayed region where a color of a pixel needs to be adjusted, and the normal display region may be a region that can be displayed by the electronic price tag in the supported colors. Specifically, for each to-be-displayed region, display colors of pixels in the to-be-displayed region are compared with the supported colors of the electronic price tag. If a display color of a pixel in the to-be-displayed region is different from the supported colors of the electronic price tag, the to-be-displayed region is determined as the to-be-adjusted display region. If the display colors of the pixels in the to-be-displayed region are the same as supported colors of the electronic price tag, the to-be-displayed region is determined as the normal display region.

In an optional embodiment, if the to-be-displayed region is a region for the item image region to display an image, the to-be-displayed region is used as the to-be-adjusted display region.

In S103, a target color of each pixel is determined from the supported colors of the electronic price tag according to a display color of the each pixel in the to-be-adjusted display region.

In this embodiment, the target color may be a color of the pixel in the to-be-adjusted display region finally displayed on the electronic price tag. Specifically, the target color of the each pixel is determined from the supported colors of the electronic price tag according to the display color of the each pixel in the to-be-adjusted display region through a certain algorithm.

In S104, a rendering result of the to-be-displayed information is generated according to the target color of the each pixel in the to-be-adjusted display region and a display color of each pixel in the normal display region, and the rendering result of the to-be-displayed information is sent to the electronic price tag so that the electronic price tag displays the to-be-displayed information.

In this embodiment, the rendering result of the to-be-displayed information may be a diagram illustrating a display effect of the to-be-displayed information.

In some embodiments, a rendering result of the to-be-adjusted display region is generated according to the target color of the each pixel in the to-be-adjusted display region, a rendering result of the normal display region is generated according to the display color of the each pixel in the normal display region, the rendering result of the to-be-adjusted display region and the rendering result of the normal display region are fused to obtain the rendering result of the to-be-displayed information, and the rendering result of the to-be-displayed information is sent to the electronic price tag so that the electronic price tag displays the to-be-displayed information.

It is to be noted that a method for generating the rendering result may be at least one method in the related art and is not limited in the present disclosure.

In a specific implementation, the rendering result of the to-be-adjusted display region and the rendering result of the normal display region are fused according to each configuration parameter of the to-be-adjusted display region to obtain the rendering result of the to-be-displayed information.

In an optional embodiment, sending the rendering result of the to-be-displayed information to the electronic price tag so that the electronic price tag displays the to-be-displayed information includes: checking whether a historical rendering result exists, where the historical rendering result may be a rendering result whose generation moment is earlier than a generation moment of the rendering result of the to-be-displayed information and is adjacent to the generation moment of the rendering result of the to-be-displayed information; if the historical rendering result exists, comparing the rendering result of the to-be-displayed image with the historical rendering result; if the rendering result of the to-be-displayed image is the same as the historical rendering result, discarding the rendering result of the to-be-displayed image; if the rendering result of the to-be-displayed image is different from the historical rendering result or no historical rendering result exists, compressing the rendering result of the to-be-displayed image, sending the compressed rendering result of the to-be-displayed information to the electronic price tag, and sending a rendering result display instruction to the electronic price tag so that the electronic price tag decompresses the compressed rendering result of the to-be-displayed information according to the rendering result display instruction to which the electronic price tag belongs and displays the rendering result of the to-be-displayed information.

It may be understood that in the above technical solution, in the case where the rendering result of the to-be-displayed image is the same as the historical rendering result, the rendering result of the to-be-displayed image is discarded so that a rendering result being displayed by the electronic price tag can be avoided being sent to the electronic price tag and unnecessary data transmission volume and resource usage volume can be reduced, thereby improving the sending efficiency of the rendering result of the to-be-displayed image different from the historical rendering result or the rendering result of the to-be-displayed image in the case where no historical rendering result exists.

Optionally, a rendering result response message fed back by the electronic price tag is received, and whether the rendering result response message is abnormal is checked. If the rendering result response message is abnormal, the rendering result of the to-be-displayed information is resent to the electronic price tag. The step of receiving the rendering result response message fed back by the electronic price tag and checking whether the rendering result response message is abnormal is returned until a check result of the rendering result response message is normal.

In this embodiment, the rendering result response message can be used for characterizing whether the electronic price tag displays the rendering result of the to-be-displayed information. A normal rendering result response message can be used for characterizing the electronic price tag displays the rendering result of the to-be-displayed information, and an abnormal rendering result response message can be used for characterizing the electronic price tag does not display the rendering result of the to-be-displayed information.

It may be understood that in the above technical solution, the rendering result response message is received, whether the rendering result response message is abnormal is checked, and in the case where the rendering result response message is abnormal, the rendering result of the to-be-displayed information is resent to the electronic price tag until the check result of the rendering result response message is normal, thereby ensuring that the electronic price tag can display the rendering result of the to-be-displayed information.

In an optional embodiment, the method for generating display information of an electronic price tag in the embodiment of the present disclosure is deployed in the server. After the server generates the rendering result of the to-be-displayed information, the rendering result of the to-be-displayed information is sent to a base station. The base station sends the rendering result of the to-be-displayed information to the electronic price tag. The base station receives the rendering result response message fed back by the electronic price tag and feeds the rendering result response message back to the server. The server checks whether the rendering result response message is abnormal. If the rendering result response message is abnormal, the number of times of message abnormality is accumulated, and whether the number of times of message abnormality exceeds a first preset number of times and a second preset number of times is confirmed, where the second preset number of times is greater than the first preset number of times. If the number of times of message abnormality does not exceed the first preset number of times, the rendering result of the to-be-displayed information is resent to the base station so that the base station sends the rendering result of the to-be-displayed information to the electronic price tag again and receives and feeds the rendering result response message back to the server. The server returns to the step of checking whether the rendering result response message is abnormal.

If the number of times of message abnormality exceeds the first preset number of times and does not exceed the second preset number of times, the rendering result of the to-be-displayed information is sent to another base station so that another base station sends the rendering result of the to-be-displayed information to the electronic price tag and receives and feeds the rendering result response message back to the server. The server returns to the step of checking whether the rendering result response message is abnormal. If the number of times of message abnormality exceeds the second preset number of times, a prompt message indicating rendering display abnormality is generated.

In the embodiment of the present disclosure, the to-be-displayed information and the supported colors of the electronic price tag are acquired, where the to-be-displayed information includes the display color of the each pixel in the at least one to-be-displayed region; the supported colors of the electronic price tag are compared with the display color of the each pixel in the at least one to-be-displayed region, and the at least one to-be-displayed region is divided into the to-be-adjusted display region and the normal display region according to the comparison result; the target color of the each pixel is determined from the supported colors of the electronic price tag according to the display color of the each pixel in the to-be-adjusted display region; the rendering result of the to-be-displayed information is generated according to the target color of the each pixel in the to-be-adjusted display region and the display color of the each pixel in the normal display region, and the rendering result of the to-be-displayed information is sent to the electronic price tag to cause the electronic price tag to display. In the technical solution of the embodiment of the present disclosure, the to-be-adjusted display region where the display color of the pixel is different from the supported colors of the electronic price tag is determined from the to-be-displayed region, and the display color of the each pixel in the to-be-adjusted display region is determined from target colors of the electronic price tag so that the electronic price tag can normally display the to-be-adjusted display region, thereby avoiding abnormal situations such as display abnormality or error reporting; the display color of the each pixel is changed so that the electronic price tag simulates and displays colors that are not supported by the electronic price tag by displaying the supported colors in a manner of alternating and combining the target color of the each pixel, thereby enriching diversity of colors that can be simulated by the electronic price tag and improving a color display effect of the electronic price tag.

Embodiment Two

Figure 2:
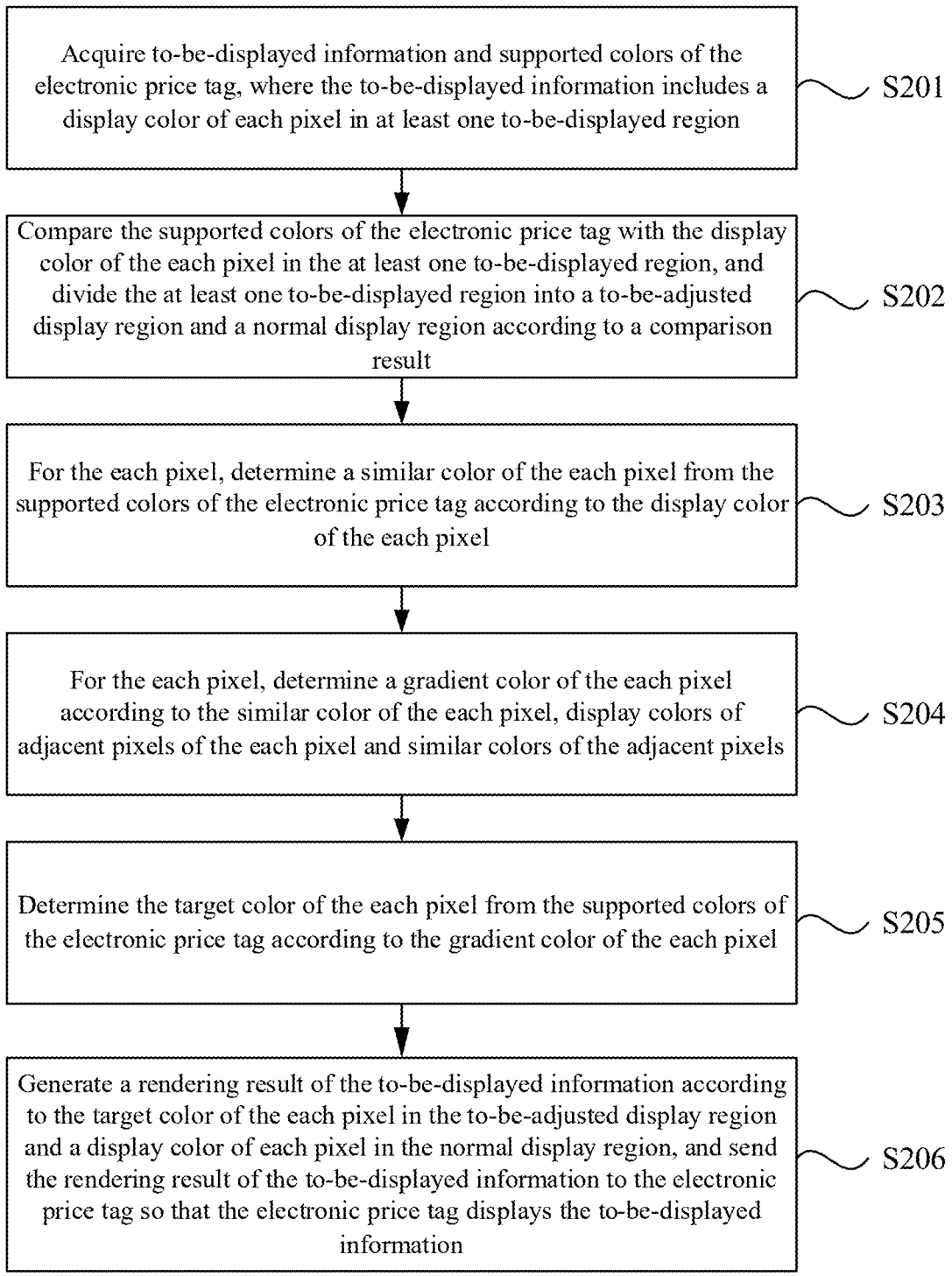
FIG. 2 is a flowchart of a method for generating display information of an electronic price tag according to embodiment two of the present disclosure.

FIG. 2 is a flowchart of a method for generating display information of an electronic price tag according to embodiment two of the present disclosure. In the embodiment of the present disclosure, the determination operation of the target color is optimized and improved on the basis of the technical solution in the preceding embodiment.

Further, the expression that "a target color of each pixel is determined from the supported colors of the electronic price tag according to a display color of the each pixel in the to-be-adjusted display region" is refined to an expression that "for the each pixel, a similar color of the each pixel is determined from the supported colors of the electronic price tag according to the display color of the each pixel; for the each pixel, a gradient color of the each pixel is determined according to the similar color of the each pixel, display colors of adjacent pixels of the each pixel and similar colors of the adjacent pixels; and the target color of the each pixel is determined from the supported colors of the electronic price tag according to the gradient color of the each pixel" to improve the determination operation of the target color.

It is to be noted that for the part not detailed in the embodiment of the present disclosure, reference may be made to expressions of the preceding embodiment.

Referring to the method for generating display information of an electronic price tag shown in FIG. 2, the method includes the steps described below.

In S201, to-be-displayed information and supported colors of the electronic price tag are acquired, where the to-be-displayed information includes a display color of each pixel in at least one to-be-displayed region.

In S202, the supported colors of the electronic price tag are compared with the display color of the each pixel in the at least one to-be-displayed region, and the at least one to-be-displayed region is divided into a to-be-adjusted display region and a normal display region according to a comparison result.

In S203, for the each pixel, a similar color of the each pixel is determined from the supported colors of the electronic price tag according to the display color of the each pixel.

In this embodiment, the similar color may be a color among the supported colors of the electronic price tag that is most similar to the display color. Specifically, for the each pixel, the similar color of the each pixel is determined from the supported colors of the electronic price tag according to the display color of the each pixel through a certain algorithm.

Optionally, determining the similar color of the each pixel from the supported colors of the electronic price tag according to the display color of the each pixel includes: converting the display color in an RGB format into a display color in a LAB format, and converting the supported colors in the RGB format into supported colors in the LAB format; performing color gamut separation on the supported colors obtained after the format conversion according to A-channel pixel values and B-channel pixel values of the supported colors obtained after the format conversion to obtain a supported color set of colors and a supported color set of grayscales; determining a supported color set corresponding to the display color obtained after the format conversion according to an A-channel pixel value and a B-channel pixel value of the display color obtained after the format conversion; determining difference degrees between the display color in the LAB format and the supported colors in the LAB format according to a pixel value of the display color obtained after the format conversion in a LAB channel and pixel values of supported colors in the corresponding supported color set in the LAB channel; converting a supported color in the LAB format with a lowest difference degree into a supported color in the RGB format, and using the obtained supported color in the RGB format as the similar color of the each pixel.

The RGB format may be a format of an RGB color space, and the LAB format may be a format of a LAB color space. The supported color set may include, but is not limited to, the supported color set of colors and the supported color set of grayscales. The supported color set of colors may include a color supported color, and the supported color set of grayscales may include a grayscale supported color.

In some embodiments, the display color in the RGB format is converted into the display color in the LAB format, and the supported colors in the RGB format are converted into the supported colors in the LAB format. For each supported color after the format conversion, a grayscale level of the supported color is determined according to an A-channel pixel value and a B-channel pixel value of the supported color. If the grayscale level of the supported color is greater than a preset grayscale level, the supported color is used as a color in the supported color set of colors. If the grayscale level of the supported color is less than or equal to the preset grayscale level, a corresponding color system of the supported color is determined according to the A-channel pixel value and the B-channel pixel value of the supported color and a A-channel pixel range and a B-channel pixel range of each color system, where the color system may include, but is not limited to, a yellow system, a blue system, a red system and a green system. A constraint condition of a grayscale supported color of the corresponding color system of the supported color is queried. Whether the supported color satisfies the constraint condition of the grayscale supported color of the corresponding color system is determined according to the A-channel pixel value and the B-channel pixel value of the supported color. If the supported color satisfies the constraint condition of the grayscale supported color of the corresponding color system, the supported color is used as the grayscale supported color. If the supported color does not satisfy the constraint condition of the grayscale supported color of the corresponding color system, the supported color is used as a color supported color. A set including each color supported color is used as the supported color set of colors, and a set including each grayscale supported color is used as the supported color set of grayscales.

For example, the following formula can be used for indicating that the grayscale level of the supported color is less than or equal to the preset grayscale level:

$$\sqrt{a^2+b^2} \le d;$$

where a denotes the A-channel pixel value, b denotes the B-channel pixel value, and d denotes the preset grayscale level.

For example, the following formula can be used for indicating a constraint condition of a grayscale supported color of the yellow system:

$$\begin{cases} b^2 - \delta_y a^2 > k_y \\ b > 0 \end{cases};$$

where $\delta_y$ denotes a grayscale purity coefficient of the yellow system, and $k_y$ denotes a grayscale depth coefficient of the yellow system.

For example, the following formula can be used for indicating a constraint condition of a grayscale supported color of the blue system:

$$\begin{cases} b^2 - \delta_b a^2 < k_b \\ b < 0 \end{cases};$$

where $\delta_b$ denotes a grayscale purity coefficient of the blue system, and $k_b$ denotes a grayscale depth coefficient of the blue system.

For example, the following formula can be used for indicating a constraint condition of a grayscale supported color of the red system:

$$\begin{cases} a^2 - \delta_r b^2 > k_r \\ a > 0 \end{cases};$$

where $\delta_r$ denotes a grayscale purity coefficient of the red system, and $k_r$ denotes a grayscale depth coefficient of the red system.

For example, the following formula can be used for indicating a constraint condition of a grayscale supported color of the green system:

$$\begin{cases} a^2 - \delta_g b^2 < k_g \\ a < 0 \end{cases};$$

where $\delta_g$ denotes a grayscale purity coefficient of the green system, and $k_g$ denotes a grayscale depth coefficient of the green system.

The grayscale purity coefficient can be used for characterizing a purity of a grayscale color in the corresponding color system, and the grayscale depth coefficient can be used for characterizing a depth of the grayscale color in the corresponding color system. The blue system is used as an example. The smaller the grayscale purity coefficient is, the lower the purity of the grayscale color in the blue system is, and the more bluish colors are used as grayscale colors. The smaller the grayscale depth coefficient is, the lower the depth of the grayscale color in the blue system is, and the more light blue colors are used as grayscale colors. It is to be noted that the grayscale purity coefficient and the grayscale depth coefficient of each color system and the preset grayscale level may be independently set by those killed according to an actual requirement or practice experience.

Whether the display color after the format conversion is the color supported color or the grayscale supported color according to the A-channel pixel value and the B-channel pixel value of the display color after the format conversion. If the display color is the color supported color, the supported color set corresponding to the display color is the supported color set of colors. If the display color is the grayscale supported color, the supported color set corresponding to the display color is the supported color set of grayscales. It is to be noted that a process of determining that the display color after the format conversion is the color supported color or the grayscale supported color is similar to the process of determining that the supported color is the color supported color or the grayscale supported color and is not repeated here.

The difference degrees between the display color in the LAB format and the supported colors in the LAB format are determined according to the pixel value of the display color obtained after the format conversion in the LAB channel and the pixel values of the supported colors in the corresponding supported color set in the LAB channel through a certain algorithm. The supported color in the LAB format with the lowest difference degree is converted into the supported color in the RGB format, and the obtained supported color in the RGB format is used as the similar color of the each pixel.

It may be understood that in the above technical solution, the display color and the supported colors are converted into the display color and the supported colors in the LAB format, and the similar color is determined in the LAB format so that the determined similar color is more consistent with the perception of a color by human eyes, even if the similar color is the most similar to the display color under the observation of the human eyes, thereby improving the accuracy of the similar color; the supported colors in the LAB format are divided into color supported colors and grayscale supported colors; moreover, the display color in the LAB format is determined, the corresponding supported color set is determined, and the supported color with the lowest difference degree is determined from the supported colors in the corresponding supported color set as the similar color, thereby further improving the accuracy of the similar color.

Optionally, determining the difference degrees between the display color in the LAB format and the supported colors in the LAB format according to the pixel value of the display color obtained after the format conversion in the LAB channel and the pixel values of the supported colors in the corresponding supported color set in the LAB channel includes: for each of the supported colors in the corresponding supported color set, determining an L-channel pixel difference value, an A-channel pixel difference value and a B-channel pixel difference value between the display color obtained after the format conversion and the each of the supported colors; and determining a difference degree between the display color in the LAB format and each of the supported colors in the LAB format according to the L-channel pixel difference value, the A-channel pixel difference value and the B-channel pixel difference value.

In some embodiments, for the each of the supported colors in the corresponding supported color set, the L-channel pixel difference value, the A-channel pixel difference value and the B-channel pixel difference value between the display color obtained after the format conversion and the each of the supported colors are determined, and a sum of an absolute value of the L-channel pixel difference value, an absolute value of the A-channel pixel difference value and an absolute value of the B-channel pixel difference value is determined as the difference degree between the display color in the LAB format and the each of the supported colors in the LAB format.

It may be understood that in the above technical solution, the difference degree between the display color and the supported color is determined according to the L-channel pixel difference value, the A-channel pixel difference value and the B-channel pixel difference value between the display color obtained after the format conversion and the supported color, thereby improving the accuracy of determining the degree of difference.

In S204, for the each pixel, a gradient color of the each pixel is determined according to the similar color of the each pixel, display colors of adjacent pixels of the each pixel and similar colors of the adjacent pixels.

In this embodiment, the adjacent pixel may be a pixel at a preset position adjacent to the pixel. The gradient color may be a color having a gradient trend with the colors of the adjacent pixels. The preset position may be independently set by those skilled according to an actual requirement or actual experience and is not limited in the present disclosure. Preferably, the preset position includes a left position, an upper left position, an upper position and an upper right position, that is, the adjacent pixels are an adjacent pixel on a left side of the pixel, an adjacent pixel on an upper left side, an adjacent pixel on the an upper side and an adjacent pixel on an upper right side.

In some embodiments, for the each pixel, the gradient color of the each pixel is determined according to the similar color of the each pixel, the display colors of the adjacent pixels of the each pixel and the similar colors of the adjacent pixels through a certain algorithm.

Optionally, for each of the adjacent pixels of the each pixel, a color difference between a display color of the each of the adjacent pixels and a similar color of the each of the adjacent pixels is determined, and the gradient color of the each pixel is determined according to the similar color of the each pixel and the color difference of the each of the adjacent pixels.

The color difference may include, but is not limited to, an R-channel pixel difference value in the RGB format, a G-channel pixel difference value in the RGB format and a B-channel pixel difference value in the RGB format. In some embodiments, for the each of the adjacent pixels of the each pixel, an R-channel pixel difference value, a G-channel pixel difference value and a B-channel pixel difference value between the display color of the each of the adjacent pixels and the similar color of the each of the adjacent pixels are determined, and the gradient color of the each pixel is determined according to the similar color of the each pixel and the color difference of the each of the adjacent pixels through a certain algorithm.

It may be understood that in the above technical solution, on the basis of the similar color of the pixel, the gradient color of the pixel is obtained according to the color difference between the display color and the similar color of each adjacent pixel around the pixel so that a color transition between the pixel and the adjacent pixel can be more smooth, thereby improving the accuracy of the gradient color and improving an effect of color gradient.

Optionally, determining the gradient color of the each pixel according to the similar color of the each pixel and the color difference of the each of the adjacent pixels includes: determining a reference color of the each pixel according to the similar color of the each pixel and the color difference of the each of the adjacent pixels; if each channel pixel value of the reference color does not exceed a pixel threshold, using the reference color as the gradient color of the each pixel; or if at least one channel pixel value of the reference color exceeds the pixel threshold, determining the gradient color of the each pixel according to the at least one channel pixel value exceeding the pixel threshold, the pixel threshold and the color difference. The reference color may be a color where whether the channel pixel value exceeds the pixel threshold is to be checked. It is to be noted that the pixel threshold may be independently set by those skilled according to an actual requirement or practice experience and is not limited in the present disclosure.

In some embodiments, a color transition weight of the adjacent pixel is queried according to a position of the adjacent pixel, and pixel values of the reference color of the pixel in an R channel, a G channel and a B channel are determined according to a color transfer weight of each adjacent pixel, pixel values of the similar color of the pixel in the R channel, the G channel and the B channel and the R-channel pixel difference value, the G-channel pixel difference value and the B-channel pixel difference value between the display color of the adjacent pixel and the similar color of the adjacent pixel to obtain the reference color of the pixel.

For example, the following formula can be used for determining the pixel values of the reference color of the pixel in the R channel, the G channel and the B channel:

$$\begin{cases} r_2 = r_1 + w_l r_l + w_{ul} r_{ul} + w_u r_u + w_{ur} r_{ur} \\ g_2 = g_1 + w_l g_l + w_{ul} g_{ul} + w_u g_u + w_{ur} g_{ur} \\ b_2 = b_1 + w_l b_l + w_{ul} b_{ul} + w_u b_u + w_{ur} b_{ur} \end{cases}$$

where $r_2$ denotes an R-channel pixel value of the reference color, $g_2$ denotes a G-channel pixel value of the reference color, $b_2$ denotes a B-channel pixel value of the reference color, $r_1$ denotes an R-channel pixel value of the similar color, $g_1$ denotes a G-channel pixel value of the similar color, $b_1$ denotes a B-channel pixel value of the similar color, $w_l$ denotes a color transition weight of the adjacent pixel on the left side, $w_{ul}$ denotes a color transition weight of the adjacent pixel on the upper left side, $w_u$ denotes a color transition weight of the adjacent pixel on the upper side, $w_{ur}$ denotes a color transition weight of the adjacent pixel on the upper right side, $r_l$ denotes an R-channel pixel value of the adjacent pixel on the left side, $r_{ul}$ denotes an R-channel pixel value of the adjacent pixel on the upper left side, $r_u$ denotes an R-channel pixel value of the adjacent pixel on the upper side, $r_{ur}$ denotes an R-channel pixel value of the adjacent pixel on the upper right side, $g_l$ denotes a G-channel pixel value of the adjacent pixel on the left side, $g_{ul}$ denotes a G-channel pixel value of the adjacent pixel on the upper left side, $g_u$ denotes a G-channel pixel value of the adjacent pixel on the upper side, $g_{ur}$ denotes a G-channel pixel value of the adjacent pixel on the upper right side, $b_l$ denotes a B-channel pixel value of the adjacent pixel on the left side, $b_{ul}$ denotes a B-channel pixel value of the adjacent pixel on the upper left side, $b_u$ denotes a B-channel pixel value of the adjacent pixel on the upper side, and $b_{ur}$ denotes a B-channel pixel value of the adjacent pixel on the upper right side.

If the each channel pixel value of the reference color does not exceed the pixel threshold, the reference color is used as the gradient color of the each pixel. If the at least one channel pixel value of the reference color exceeds the pixel threshold, for each channel whose pixel value exceeds the pixel threshold, a first pixel difference value between a pixel value of the reference color in the channel and a pixel value of the similar color in the channel is determined. If the first pixel difference value is a positive number, a second pixel difference value between the pixel threshold and the channel pixel value is determined, and a ratio of the second pixel difference value and the first pixel difference value is used as a candidate adjustment coefficient. If the second pixel difference value is a negative number, a ratio of a negative value of the channel pixel value and the first pixel difference value is used as the candidate adjustment coefficient. A minimum candidate adjustment coefficient is determined as a target adjustment coefficient. The pixel values of the reference color of the pixel in the R channel, the G channel and the B channel are determined according to the color transfer weight of each adjacent pixel, the pixel values of the similar color of the pixel in the R channel, the G channel and the B channel, the target adjustment coefficient and the R-channel pixel difference value, the G-channel pixel difference value and the B-channel pixel difference value between the display color of the adjacent pixel and the similar color of the adjacent pixel to obtain the gradient color of the pixel. For example, the following formulas can be used for determining pixel values of the gradient color of the pixel in the R channel, the G channel and the B channel:

$$\begin{cases} r_3 = r_1 + P \cdot (w_l r_l + w_{ul} r_{ul} + w_u r_u + w_{ur} r_{ur}) \\ g_3 = g_1 + P \cdot (w_l g_l + w_{ul} g_{ul} + w_u g_u + w_{ur} g_{ur}) \\ b_3 = b_1 + P \cdot (w_l b_l + w_{ul} b_{ul} + w_u b_u + w_{ur} b_{ur}) \end{cases}$$

$$P = \min(\mu_i);$$

$$\mu_i = \begin{cases} \dfrac{u - i_1}{i_2 - i_1}, & i_2 - i_1 > 0 \\ -\dfrac{i_1}{i_2 - i_1}, & i_2 - i_1 < 0 \end{cases};$$

where P denotes the target adjustment coefficient, i denotes the channel whose pixel value exceeds the pixel threshold among the R channel, the G channel and the B channel, $\mu_i$ denotes the candidate adjustment coefficient corresponding to the channel i, u denotes the pixel threshold, $i_2$ denotes the pixel value of the reference color in the channel i, and $i_1$ denotes the pixel value of the similar color in the channel i.

It may be understood that in the above technical solution, whether each channel pixel value of the reference color exceeds the pixel threshold can be checked. If the each channel pixel value of the reference color exceeds the pixel threshold, the gradient color of the pixel is determined according to the channel pixel value exceeding the pixel threshold, the pixel threshold and the color difference to ensure that each channel pixel value of the gradient color does not exceed the pixel threshold while the gradient color is obtained, thereby avoiding the case where the gradient color is displayed abnormally since the pixel value exceeds the pixel threshold and ensuring that the gradient color can be displayed correctly.

In S205, the target color of the each pixel is determined from the supported colors of the electronic price tag according to the gradient color of the each pixel.

It is to be noted that a process of determining the target color of the each pixel from the supported colors of the electronic price tag according to the gradient color of the each pixel is similar to the process of determining the similar color of the each pixel from the supported colors of the electronic price tag according to the display color of the each pixel and is not repeated here.

In S206, a rendering result of the to-be-displayed information is generated according to the target color of the each pixel in the to-be-adjusted display region and a display color of each pixel in the normal display region, and the rendering result of the to-be-displayed information is sent to the electronic price tag so that the electronic price tag displays the to-be-displayed information.

In an optional embodiment, the to-be-displayed region may be a promotion region. A pixel in the promotion region may include, but is not limited to, a background pixel and a text pixel. The background pixel may be a pixel in a background of the promotion region, and the text pixel may be a pixel of a text in the promotion region for expressing promotional words. The to-be-displayed information includes a display color of each background pixel in at least one promotion region. Correspondingly, the rendering result of the to-be-displayed information is a rendering result of a background color of the promotion region.

It is to be noted that a display color of the text pixel is generally the supported color of the electronic price tag. Therefore, a step of comparing the display color of the text pixel with the supported color of the electronic price tag and determining a target color of the text pixel does not need to be performed. The display color of the background pixel is generally not the supported color of the electronic price tag, or the rendering result of the background color of the promotion region needs to be observed by the human eyes as the color that is not supported by the electronic price tag. The method for generating display information of an electronic price tag in the embodiment of the present disclosure is performed so that a target color of each background pixel is determined, the rendering result of the background color of the promotion region is generated, and in the case where the electronic price tag displays the rendering result of the background color of the promotion region in the supported colors, the rendering result of the background color of the promotion region observed by the human eyes is another color that is not supported by the electronic price tag, thereby improving a display effect of the electronic price tag on the promotion region.

For example, if the supported colors of the electronic price tag include only black, white, yellow and red, through the method for generating display information of an electronic price tag in the embodiment of the present disclosure, in the case where the electronic price tag displays the rendering result of the background color of the promotion region in black and white supported colors, the background of the promotion region can be observed by the human eyes as gray; in the case where the electronic price tag displays the rendering result of the background color of the promotion region in red and yellow supported colors, the background of the promotion region can be observed by the human eyes as orange. With another combination of supported colors and different numbers of pixels in the supported colors, another mixed color can also be observed by the human eyes, which is not repeated here. If the background of the promotion region is an image, a color change of the image in the background of the promotion region can also be smoother.

In another optional embodiment, if the to-be-displayed information includes a display color of each text pixel in at least one promotion region and the display color of the text pixel is not the supported color of the electronic price tag, a target color of each text pixel can also be determined through the method for generating display information of an electronic price tag in the embodiment of the present disclosure, and a rendering result of a text color is generated and sent to the electronic price tag so that in the case where the electronic price tag displays the rendering result of the text color of the promotion region in the supported colors, the rendering result of the text color of the promotion region observed by the human eyes is another color that is not supported by the electronic price tag, thereby further improving the display effect of the electronic price tag on the promotion region.

In the embodiment of the present disclosure, for the each pixel, the similar color of the each pixel is determined from the supported colors of the electronic price tag according to the display color of the each pixel; for the each pixel, the gradient color of the each pixel is determined according to the similar color of the each pixel, the display colors of the adjacent pixels of the each pixel and the similar colors of the adjacent pixels; and the target color of the each pixel is determined from the supported colors of the electronic price tag according to the gradient color of the each pixel. After the similar color of the each pixel is determined, the gradient color of the each pixel can be determined on the basis of the similar color of the pixel, and the target color of the pixel can be determined according to the gradient color of the pixel, thereby controlling the color of the each pixel. The target color of the each pixel is arranged, thereby simulating and displaying to-be-displayed information of more colors and improving the display effect of the to-be-displayed information.

Embodiment Three

Figure 3:
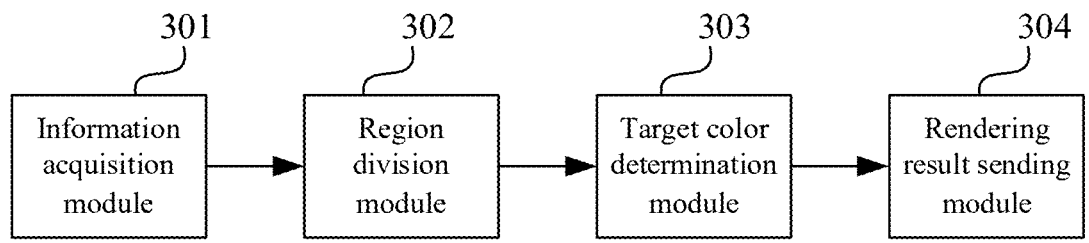
FIG. 3 is a structure diagram of an apparatus for generating display information of an electronic price tag according to embodiment three of the present disclosure.

FIG. 3 is a structure diagram of an apparatus for generating display information of an electronic price tag according to embodiment three of the present disclosure. The embodiment of the present disclosure may be applicable to the case of displaying to-be-displayed information of the electronic price tag. The apparatus may perform a method for generating display information of an electronic price tag. The apparatus for generating display information of an electronic price tag may be implemented in a form of hardware and/or software. The apparatus may be configured in a device for generating display information of an electronic price tag, for example, a server.

Referring to the apparatus for generating display information of an electronic price tag shown in FIG. 3, the apparatus includes an information acquisition module 301, a region division module 302, a target color determination module 303 and a rendering result sending module 304.

The information acquisition module 301 is configured to acquire to-be-displayed information and supported colors of the electronic price tag, where the to-be-displayed information includes a display color of each pixel in at least one to-be-displayed region.

The region division module 302 is configured to compare the supported colors of the electronic price tag with the display color of the each pixel in the at least one to-be-displayed region and divide the at least one to-be-displayed region into a to-be-adjusted display region and a normal display region according to a comparison result.

The target color determination module 303 is configured to determine a target color of each pixel from the supported colors of the electronic price tag according to a display color of the each pixel in the to-be-adjusted display region.

The rendering result sending module 304 is configured to generate a rendering result of the to-be-displayed information according to the target color of the each pixel in the to-be-adjusted display region and a display color of each pixel in the normal display region and send the rendering result of the to-be-displayed information to the electronic price tag so that the electronic price tag displays the to-be-displayed information.

In the embodiment of the present disclosure, the information acquisition module acquires the to-be-displayed information and the supported colors of the electronic price tag, where the to-be-displayed information includes the display color of the each pixel in the at least one to-be-displayed region; the region division module compares the supported colors of the electronic price tag with the display color of the each pixel in the at least one to-be-displayed region and divides the at least one to-be-displayed region into the to-be-adjusted display region and the normal display region according to the comparison result; the target color determination module determines the target color of the each pixel from the supported colors of the electronic price tag according to the display color of the each pixel in the to-be-adjusted display region; and the rendering result sending module generates the rendering result of the to-be-displayed information according to the target color of the each pixel in the to-be-adjusted display region and the display color of the each pixel in the normal display region and sends the rendering result of the to-be-displayed information to the electronic price tag so that the electronic price tag displays the to-be-displayed information. In the technical solution of the embodiment of the present disclosure, the to-be-adjusted display region where the display color of the pixel is different from the supported colors of the electronic price tag is determined from the to-be-displayed region, and the display color of the each pixel in the to-be-adjusted display region is determined from target colors of the electronic price tag so that the electronic price tag can normally display the to-be-adjusted display region, thereby avoiding abnormal situations such as display abnormality or error reporting; the display color of the each pixel is changed so that the electronic price tag simulates and displays colors that are not supported by the electronic price tag by displaying the supported colors in a manner of alternating and combining the target color of the each pixel, thereby enriching diversity of colors that can be simulated by the electronic price tag and improving a color display effect of the electronic price tag.

Optionally, the target color determination module 302 includes a similar color determination unit, a gradient color determination unit and a target color determination unit.

The similar color determination unit is configured to determine, for the each pixel, a similar color of the each pixel from the supported colors of the electronic price tag according to the display color of the each pixel.

The gradient color determination unit is configured to determine, for the each pixel, a gradient color of the each pixel according to the similar color of the each pixel, display colors of adjacent pixels of the each pixel and similar colors of the adjacent pixels.

The target color determination unit is configured to determine the target color of the each pixel from the supported colors of the electronic price tag according to the gradient color of the each pixel.

Optionally, the similar color determination unit includes a format conversion subunit, a color gamut separation subunit, a supported color set determination subunit, a difference degree determination subunit and a similar color determination subunit.

The format conversion subunit is configured to convert the display color in an RGB format into a display color in a LAB format and convert the supported colors in the RGB format into supported colors in the LAB format.

The color gamut separation subunit is configured to perform color gamut separation on the supported colors obtained after the format conversion according to A-channel pixel values and B-channel pixel values of the supported colors obtained after the format conversion to obtain a supported color set of colors and a supported color set of grayscales.

The supported color set determination subunit is configured to determine a supported color set corresponding to the display color obtained after the format conversion according to an A-channel pixel value and a B-channel pixel value of the display color obtained after the format conversion.

The difference degree determination subunit is configured to determine difference degrees between the display color in the LAB format and the supported colors in the LAB format according to a pixel value of the display color obtained after the format conversion in a LAB channel and pixel values of supported colors in the corresponding supported color set in the LAB channel.

The similar color determination subunit is configured to convert a supported color in the LAB format with a lowest difference degree into a supported color in the RGB format and use the obtained supported color in the RGB format as the similar color of the each pixel.

Optionally, the difference degree determination subunit is specifically configured to perform the operations described below.

For each of the supported colors in the corresponding supported color set, an L-channel pixel difference value, an A-channel pixel difference value and a B-channel pixel difference value between the display color obtained after the format conversion and the each of the supported colors are determined.

A difference degree between the display color in the LAB format and each of the supported colors in the LAB format is determined according to the L-channel pixel difference value, the A-channel pixel difference value and the B-channel pixel difference value.

Optionally, the gradient color determination unit includes a color difference determination subunit and a gradient color determination subunit.

The color difference determination subunit is configured to determine, for each of the adjacent pixels of the each pixel, a color difference between a display color of the each of the adjacent pixels and a similar color of the each of the adjacent pixels.

The gradient color determination subunit is configured to determine the gradient color of the each pixel according to the similar color of the each pixel and the color difference of the each of the adjacent pixels.

Optionally, the gradient color determination subunit is specifically configured to perform the operations described below.

A reference color of the each pixel is determined according to the similar color of the each pixel and the color difference of the each of the adjacent pixels.

If each channel pixel value of the reference color does not exceed a pixel threshold, the reference color is used as the gradient color of the each pixel.

If at least one channel pixel value of the reference color exceeds the pixel threshold, the gradient color of the each pixel is determined according to the at least one channel pixel value exceeding the pixel threshold, the pixel threshold and the color difference.

Optionally, the apparatus for generating display information of an electronic price tag is specifically configured to perform the operations described below.

A rendering result response message fed back by the electronic price tag is received, and whether the rendering result response message is abnormal is checked.

If the rendering result response message is abnormal, the rendering result of the to-be-displayed information is resent to the electronic price tag.

The step of receiving the rendering result response message fed back by the electronic price tag and checking whether the rendering result response message is abnormal is returned until a check result of the rendering result response message is normal.

The apparatus for generating display information of an electronic price tag provided in the embodiment of the present disclosure may perform the method for generating display information of an electronic price tag provided in any embodiment of the present disclosure and has functional modules and beneficial effects corresponding to the performed method for generating display information of an electronic price tag.

Embodiment Four

Figure 4:
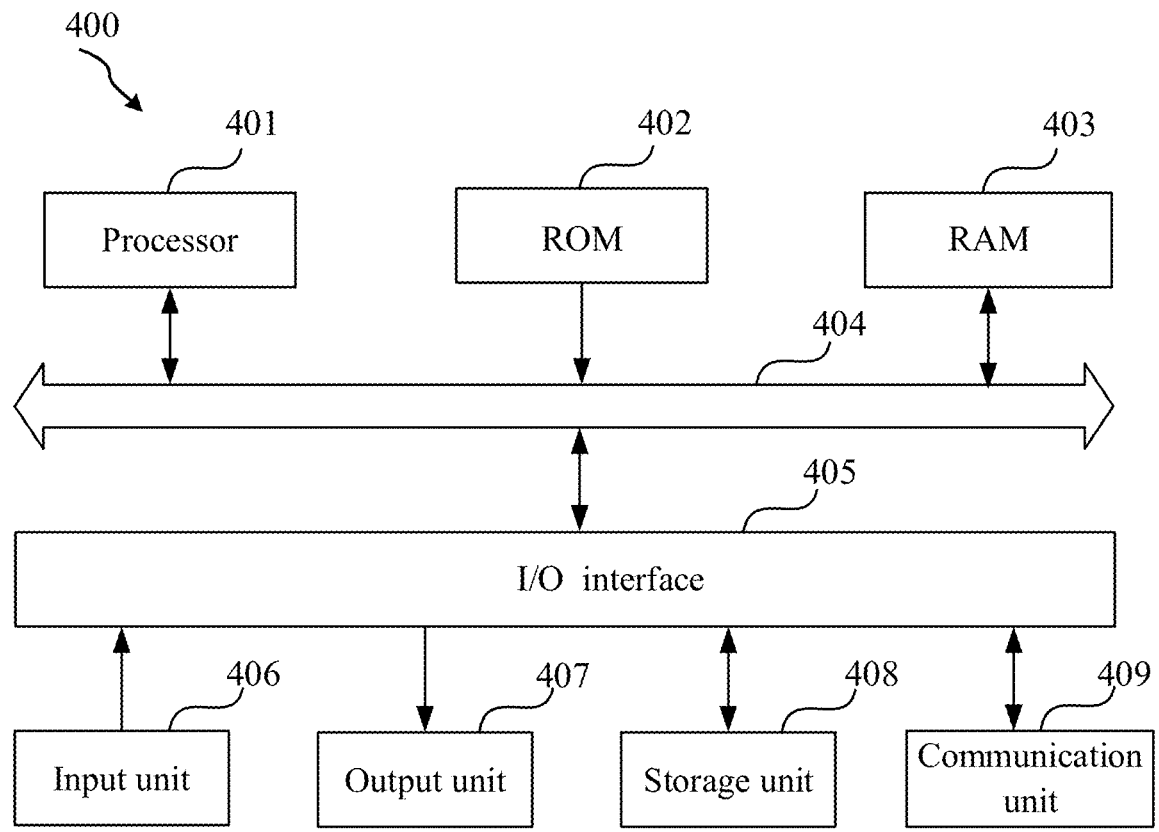
FIG. 4 is a structure diagram of a device for generating display information of an electronic price tag implementing the method for generating display information of an electronic price tag in the embodiment of the present disclosure.

FIG. 4 is a structure diagram of a device 400 for generating display information of an electronic price tag that can be used for implementing the embodiment of the present disclosure. The device for generating display information of an electronic price tag is intended to represent various forms of digital computers, for example, a laptop computer, a desktop computer, a worktable, a personal digital assistant, a server, a blade server, a mainframe computer and an applicable computer. The device for generating display information of an electronic price tag may also represent various forms of mobile apparatuses, for example, a personal digital assistant, a cellphone, a smartphone, a wearable device (such as a helmet, glasses and a watch) and a similar computing apparatus. Herein the shown components, the connections and relationships between these components, and the functions of these components are illustrative only and are not intended to limit the implementation of the present disclosure as described and/or claimed herein.

As shown in FIG. 4, the device 400 for generating display information of an electronic price tag includes at least one processor 401 and a memory (such as a read-only memory (ROM) 402 and a random-access memory (RAM) 403) communicatively connected to the at least one processor 401. The memory stores a computer program executable by the at least one processor. A processor 401 may perform various types of appropriate operations and processing according to a computer program stored in a ROM 402 or a computer program loaded from a storage unit 408 to a RAM 403. Various programs and data required for the operation of the device 400 for generating display information of an electronic price tag are also stored in the RAM 403. The processor 401, the ROM 402 and the RAM 403 are connected to each other through a bus 404. An input/output (I/O) interface 405 is also connected to the bus 404.

Multiple components in the device 400 for generating display information of an electronic price tag are connected to the I/O interface 405. The multiple components include an input unit 406 such as a keyboard and a mouse, an output unit 407 such as various types of displays and speakers, the storage unit 408 such as a magnetic disk and an optical disk, and a communication unit 409 such as a network card, a modem and a wireless communication transceiver. The communication unit 409 allows the device 400 for generating display information of an electronic price tag to exchange information/data with other devices over a computer network such as the Internet and/or various telecommunications networks.

The processor 401 may be various general-purpose and/or special-purpose processing components having processing and computing capabilities. Examples of the processor 401 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The at least one processor 401 performs various preceding methods and processing, such as the method for generating display information of an electronic price tag.

In some embodiments, the method for generating display information of an electronic price tag may be implemented as computer programs tangibly contained in a computer-readable storage medium such as the storage unit 408. In some embodiments, part or all of computer programs may be loaded and/or installed onto the device 400 for generating display information of an electronic price tag via the ROM 402 and/or the communication unit 409. When the computer programs are loaded to the RAM 403 and executed by the at least one processor 401, one or more steps of the preceding method for generating display information of an electronic price tag may be performed. Alternatively, in other embodiments, the at least one processor 401 may be configured, in any other suitable manners (for example, by use of firmware), to perform the method for generating display information of an electronic price tag.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Computer programs for implementation of the methods of the present disclosure may be written in one programming language or any combination of multiple programming languages. These computer programs may be provided for a processor of a general-purpose computer, a special-purpose computer or another programmable apparatus for generating display information of an electronic price tag such that the computer programs, when executed by the processor, cause functions/operations specified in the flowcharts and/or block diagrams to be implemented. These computer programs may be executed entirely on a machine, partly on a machine, as a stand-alone software package, partly on a machine and partly on a remote machine, or entirely on a remote machine or a server.

In the context of the present disclosure, the computer-readable storage medium may be a tangible medium including or storing a computer program that is used by or used in conjunction with an instruction execution system, apparatus or device. The computer-readable storage medium may include, but is not limited to, an electronic, magnetic, optical, electromagnetic, infrared or semiconductor system, apparatus or device, or any suitable combination thereof. Alternatively, the computer-readable storage medium may be a machine-readable signal medium. Concrete examples of the machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on the device for generating display information of an electronic price tag. The device for generating display information of an electronic price tag has a display device (for example, a cathode-ray tube (CRT) or a liquid-crystal display (LCD) monitor) for displaying information to the user; and a keyboard and a pointing device (for example, a mouse or a trackball) through which the user can provide input for the device for generating display information of an electronic price tag. Other types of apparatuses may also be used for providing interaction with the user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a user computer having a graphical user interface or a web browser through which the user can interact with embodiments of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

Embodiment Five

Figure 5A:
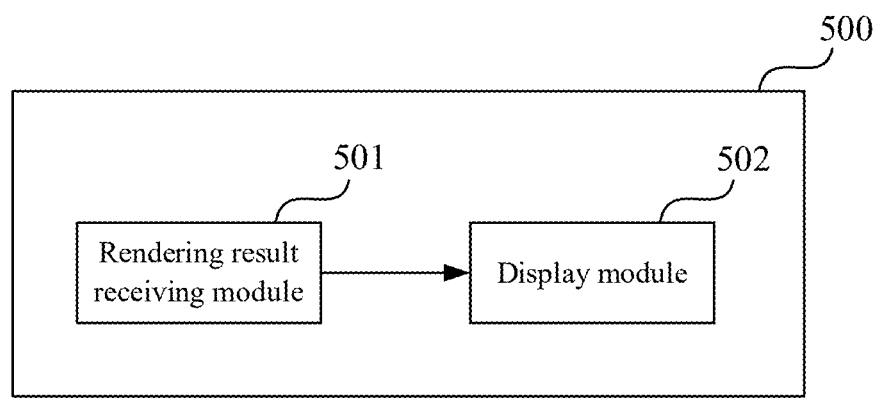
FIG. 5A is a structure diagram of an electronic price tag according to embodiment five of the present disclosure.

FIG. 5A is a structure diagram of an electronic price tag 500 according to embodiment five of the present disclosure. The embodiment of the present disclosure may be applicable to the case of displaying to-be-displayed information of the electronic price tag. The electronic price tag 500 is communicatively connected to the device 400 for generating display information of an electronic price tag.

Referring to the electronic price tag 500 shown in FIG. 5A, the electronic price tag 500 includes a rendering result receiving module 501 and a display module 502, where the rendering result receiving module is configured to receive a rendering result of to-be-displayed information generated through the method for generating display information of an electronic price tag provided in any one of the embodiments of the present disclosure, and the display module 502 is communicatively connected to the rendering result receiving module 501.

The rendering result receiving module 501 is configured to receive a rendering result of to-be-displayed information sent by the device 400 for generating display information of an electronic price tag.

The display module 502 is configured to display the rendering result of the to-be-displayed information in supported colors of the electronic price tag and/or display the rendering result of the to-be-displayed information in a mixed color consisting of the supported colors.

In this embodiment, the device 400 for generating display information of an electronic price tag generates the rendering result of the to-be-displayed information in the following manner: acquiring to-be-displayed information and supported colors of the electronic price tag, where the to-be-displayed information includes a display color of each pixel in at least one to-be-displayed region; comparing the supported colors of the electronic price tag with the display color of the each pixel in the at least one to-be-displayed region, and dividing the at least one to-be-displayed region into a to-be-adjusted display region and a normal display region according to a comparison result; determining a target color of each pixel from the supported colors of the electronic price tag according to a display color of the each pixel in the to-be-adjusted display region; generating a rendering result of the to-be-displayed information according to the target color of the each pixel in the to-be-adjusted display region and a display color of each pixel in the normal display region.

In this embodiment, the mixed color may be understood as a color except the supported colors that are observed by human eyes through a combination of at least two supported colors. For example, a green mixed color can be observed by the human eyes through a combination of a black supported color and a yellow supported color.

In an optional embodiment, the display module 502 is configured to determine, for each pixel in the rendering result of the to-be-displayed information, a supported color that is the same as a target color of the pixel from the supported colors of the electronic price tag and display the pixel in the supported color that is the same as the target color of the pixel. In the above technical solution, each pixel is displayed in a mixture of different supported colors, thereby achieving an effect of displaying the rendering result of the to-be-displayed information in the mixed color.

Figure 5B:
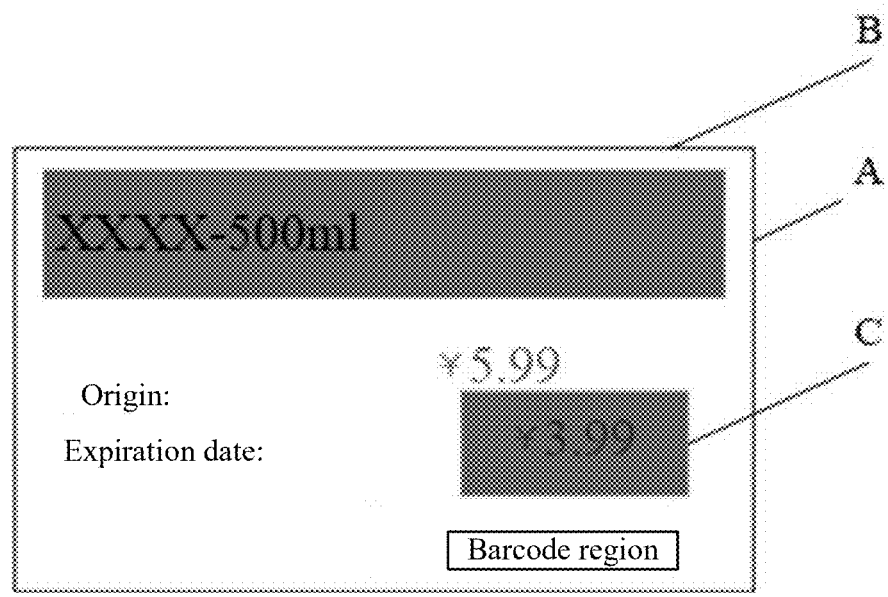
FIG. 5B is a diagram illustrating a display effect of an electronic price tag according to embodiment five of the present disclosure.

Optionally, FIG. 5B is a diagram illustrating a display effect of an electronic price tag. As shown in FIG. 5B, information of an "XXXX" product with a capacity of 500 ml is displayed, where "XXXX" is a product name. In FIG. 5B, a color of "XXXX-500 ml" is black, a color of "¥3.99" is red, and colors of "Origin", "Expiration date" and "¥5.99" are green. A barcode region is used for displaying a barcode of the "XXXX" product, a rectangular region with a ground color where "XXXX-500 ml" is located is a promotion region B, and a rectangular region with a ground color where "¥3.99" is located is a promotion region C. The ground colors of the promotion region B and the promotion region C are orange, and a region A is a display region of the electronic price tag.

In this embodiment, supported colors of the electronic price tag are black, white, red and yellow. Each pixel at a position corresponding to "XXXX-500 ml" is displayed in a black supported color, each pixel in the barcode region is displayed in black and white supported colors to display a black and white barcode, each pixel at a position corresponding to "¥3.99" is displayed in a red supported color, and "Origin", "Expiration date" and "¥5.99" are displayed in a green mixed color formed by a combination of pixels displayed in black and pixels displayed in yellow. The promotion region B and the promotion region C are displayed in an orange mixed color obtained by a combination of yellow pixels and red pixels. It is to be noted that the number of promotion regions and a position and a size of each promotion region may be independently set in to-be-displayed information by those skilled.

In an optional embodiment, if each pixel in the promotion region is displayed in the same supported color, the promotion region is displayed in the corresponding supported color. For example, if each pixel in the promotion region is displayed in a yellow supported color, the promotion region is displayed in yellow, and if pixels displayed in different supported colors exist in the promotion region, the promotion region can be displayed in a mixed color. For example, if the promotion region includes a pixel displayed in yellow and a pixel displayed in red, the promotion region can be displayed in orange formed by a combination of yellow and red, and if the promotion region includes a pixel displayed in white and a pixel displayed in red, the promotion region can be displayed in pink formed by a combination of white and red.

In an optional embodiment, the electronic price tag 500 may not be communicatively connected to the device 400 for generating display information of an electronic price tag. The electronic price tag 500 may further include a chip 503 for generating display information of an electronic price tag. The chip 503 for generating display information of an electronic price tag may implement the method for generating display information of an electronic price tag provided in any embodiment of the present disclosure to obtain the rendering result of the to-be-displayed information. The display module 502 is configured to acquire the rendering result of the to-be-displayed information generated by the chip 503 for generating display information of an electronic price tag, display the rendering result of the to-be-displayed information in the supported colors of the electronic price tag and/or display the rendering result of the to-be-displayed information in the mixed color consisting of the supported colors.

The electronic price tag provided in the embodiment of the present disclosure can receive the rendering result of the to-be-displayed information generated by the deployed device for generating display information of an electronic price tag in any embodiment of the present disclosure, further displays the rendering result of the to-be-displayed information in the supported colors of the electronic price tag and/or displays the rendering result of the to-be-displayed information in the mixed color consisting of the supported colors. In the embodiment of the present disclosure, the electronic price tag can normally display the to-be-adjusted display region, thereby avoiding abnormal situations such as display abnormality or error reporting; the rendering result of the to-be-displayed information is displayed in the mixed color consisting of the supported colors, thereby enriching diversity of colors that can be simulated by the electronic price tag and improving a color display effect of the electronic price tag.

Embodiment Six

Figure 6:
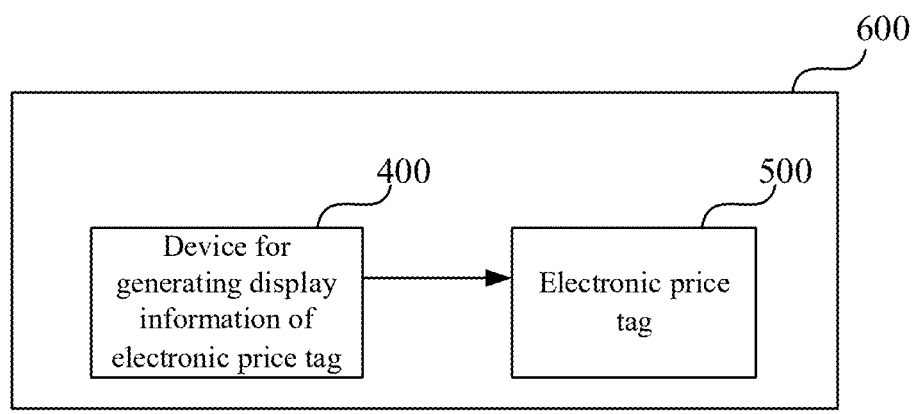
FIG. 6 is a structure diagram of a system for displaying an electronic price tag according to embodiment six of the present disclosure.

FIG. 6 is a structure diagram of a system 600 for displaying an electronic price tag according to embodiment six of the present disclosure. The embodiment of the present disclosure may be applicable to the case of displaying to-be-displayed information of the electronic price tag.

Referring to the system 600 for displaying an electronic price tag shown in FIG. 6, the system 600 includes a device 400 for generating display information of an electronic price tag and an electronic price tag 500, where the device 400 for generating display information of an electronic price tag is configured to implement the method for generating display information of an electronic price tag provided in any embodiment of the present disclosure, and the electronic price tag 500 is communicatively connected to the device 400 for generating display information of an electronic price tag. It is to be noted that a manner of the communication connection is not limited in the present disclosure. For example, the manner of the communication connection may be the second generation of mobile communication technology (2G), the third generation of mobile communication technology (3G), the fourth generation of mobile communication technology (4G), the fifth generation of mobile communication technology (5G), wireless network communication technology (Wi-Fi), Bluetooth and a customized communication protocol.

The device 400 for generating display information of an electronic price tag is configured to perform the following operations: acquiring to-be-displayed information and supported colors of the electronic price tag, where the to-be-displayed information includes a display color of each pixel in at least one to-be-displayed region; comparing the supported colors of the electronic price tag with the display color of the each pixel in the at least one to-be-displayed region, and dividing the at least one to-be-displayed region into a to-be-adjusted display region and a normal display region according to a comparison result; determining a target color of each pixel from the supported colors of the electronic price tag according to a display color of the each pixel in the to-be-adjusted display region; generating a rendering result of the to-be-displayed information according to the target color of the each pixel in the to-be-adjusted display region and a display color of each pixel in the normal display region, and sending the rendering result of the to-be-displayed information to the electronic price tag so that the electronic price tag displays the to-be-displayed information.

The electronic price tag 500 is configured to receive the rendering result of the to-be-displayed information sent by the device for generating display information of an electronic price tag, display the rendering result of the to-be-displayed information in the supported colors of the electronic price tag and/or display the rendering result of the to-be-displayed information in a mixed color consisting of the supported colors.

In the system for displaying an electronic price tag provided in the embodiment of the present disclosure, the device for generating display information of an electronic price tag determines the to-be-adjusted display region where the display color of the pixel is different from the supported colors of the electronic price tag from the to-be-displayed region and determines the display color of the each pixel in the to-be-adjusted display region from target colors of the electronic price tag so that the electronic price tag can normally display the to-be-adjusted display region, thereby avoiding abnormal situations such as display abnormality or error reporting; the device for generating display information of an electronic price tag changes the display color of the each pixel so that the electronic price tag displays the rendering result of the to-be-displayed information in the mixed color consisting of the supported colors and the electronic price tag simulates and displays colors that are not supported by the electronic price tag by displaying the supported colors, thereby enriching diversity of colors that can be simulated by the electronic price tag and improving a color display effect of the electronic price tag.

The system for displaying an electronic price tag provided in the embodiment of the present disclosure may perform the method for generating display information of an electronic price tag provided in any embodiment of the present disclosure and has functional modules and beneficial effects corresponding to the performed method for generating display information of an electronic price tag.

It is to be understood that various forms of the preceding flows may be used with steps reordered, added or deleted. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors.

What is claimed is:

1. A method for generating display information of an electronic price tag, wherein the method for generating display information of an electronic price tag is performed by at least one processor of a device for generating display information of an electronic price tag, and comprises:

acquiring to-be-displayed information and supported colors of the electronic price tag, wherein the to-be-displayed information comprises a display color of each pixel in at least one to-be-displayed region, and each of the supported colors is a color supported and displayed by the electronic price tag;

comparing the supported colors of the electronic price tag with the display color of each pixel in the at least one to-be-displayed region, and dividing the at least one to-be-displayed region into a to-be-adjusted display region and a normal display region according to a comparison result, wherein for each to-be-displayed region, in response to a display color of a pixel in the to-be-displayed region is different from the supported colors of the electronic price tag, the to-be-displayed region is determined as the to-be-adjusted display region; and for each to-be-displayed region, in response to the display colors of pixels in the to-be-displayed region are the same as the supported colors of the electronic price tag, the to-be-displayed region is determined as the normal display region;

determining a target color of each pixel in the to-be-adjusted display region from the supported colors of the electronic price tag according to a display color of the each pixel in the to-be-adjusted display region; and generating a rendering result of the to-be-displayed information according to the target color of each pixel in the to-be-adjusted display region and a display color of each pixel in the normal display region, and sending the rendering result of the to-be-displayed information to the electronic price tag so that the electronic price tag displays the rendering result of the to-be-displayed information, wherein determining the target color of the each pixel in the to-be-adjusted display region from the supported colors of the electronic price tag according to the display color of the each pixel in the to-be-adjusted display region comprises: for each pixel in the to-be-adjusted display region;

determining a similar color of the each pixel from the supported colors of the electronic price tag according to the display color of the each pixel;

determining a gradient color of the each pixel according to the similar color of the each pixel, display colors of adjacent pixels of the each pixel and similar colors of the adjacent pixels; and determining the target color of the each pixel from the supported colors of the electronic price tag according to the gradient color of the each pixel.

2. The method according to claim 1, wherein determining the similar color of the each pixel from the supported colors of the electronic price tag according to the display color of the each pixel comprises:

converting the display color of the each pixel in an RGB format into a display color in a LAB format, and converting the supported colors in the RGB format into supported colors in the LAB format, wherein the RGB format is a format of an RGB color space, and the LAB format is a format of a LAB color space;

performing color gamut separation on the supported colors obtained after a format conversion according to A-channel pixel values and B-channel pixel values of the supported colors obtained after the format conversion to obtain a supported color set of colors and a supported color set of grayscales;

determining a supported color set corresponding to the display color obtained after a format conversion according to an A-channel pixel value and a B-channel pixel value of the display color obtained after the format conversion;

determining difference degrees between the display color in the LAB format and the supported colors in the LAB format according to a pixel value of the display color, obtained after the format conversion, in a LAB channel and pixel values of supported colors in the determined supported color set in the LAB channel; and converting a supported color in the LAB format with a lowest difference degree into a supported color in the RGB format, and using the obtained supported color in the RGB format as the similar color of the each pixel.

3. The method according to claim 2, wherein determining the difference degrees between the display color in the LAB format and the supported colors in the LAB format according to the pixel value of the display color obtained after the format conversion in the LAB channel and the pixel values of the supported colors in the determined supported color set in the LAB channel comprises:

for each of the supported colors in the determined supported color set, determining an L-channel pixel difference value, an A-channel pixel difference value and a B-channel pixel difference value between the display color obtained after the format conversion and the each of the supported colors; and determining a difference degree between the display color in the LAB format and each of the supported colors in the LAB format according to the L-channel pixel difference value, the A-channel pixel difference value and the B-channel pixel difference value.

4. The method according to claim 1, wherein determining the gradient color of the each pixel according to the similar color of the each pixel, the display colors of the adjacent pixels of the each pixel and the similar colors of the adjacent pixels comprises:

for each of the adjacent pixels of the each pixel, determining a color difference between a display color of the each of the adjacent pixels and a similar color of the each of the adjacent pixels; and determining the gradient color of the each pixel according to the similar color of the each pixel and the color difference of the each of the adjacent pixels.

5. The method according to claim 4, wherein determining the gradient color of the each pixel according to the similar color of the each pixel and the color difference of the each of the adjacent pixels comprises:

determining a reference color of the each pixel according to the similar color of the each pixel and the color difference of the each of the adjacent pixels;

if each channel pixel value of the reference color does not exceed a pixel threshold, using the reference color as the gradient color of the each pixel; and if at least one channel pixel value of the reference color exceeds a pixel threshold, determining the gradient color of the each pixel according to the at least one channel pixel value exceeding the pixel threshold, the pixel threshold and the color difference.

6. The method according to claim 1, further comprising:

receiving a rendering result response message fed back by the electronic price tag, and checking whether the rendering result response message is abnormal;

if the rendering result response message is abnormal, resending the rendering result of the to-be-displayed information to the electronic price tag; and returning to the step of receiving the rendering result response message fed back by the electronic price tag and checking whether the rendering result response message is abnormal until a check result of the rendering result response message is normal.

7. The method according to claim 1, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

8. The method according to claim 1, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

9. The method according to claim 2, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

10. The method according to claim 3, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

11. The method according to claim 4, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

12. The method according to claim 5, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

13. The method according to claim 6, wherein the at least one to-be-displayed region comprises a promotion region, the to-be-displayed information comprises a display color of each background pixel in at least one promotion region, and the rendering result of the to-be-displayed information is a rendering result of a background color of the at least one promotion region.

14. A device for generating display information of an electronic price tag, comprising:

at least one processor; and a memory, communicatively connected to the at least one processor;

wherein the memory stores a computer program executable by the at least one processor to cause the at least one processor to perform a method for generating display information of an electronic price tag; and wherein the method for generating display information of an electronic price tag comprises:

acquiring to-be-displayed information and supported colors of the electronic price tag, wherein the to-be-displayed information comprises a display color of each pixel in at least one to-be-displayed region, and each of the supported colors is a color supported and
displayed by the electronic price tag;
comparing the supported colors of the electronic price tag
with the display color of each pixel in the at least one
to-be-displayed region, and dividing the at least one
to-be-displayed region into a to-be-adjusted display
region and a normal display region according to a
comparison result, wherein for each to-be-displayed
region, in response to a display color of a pixel in the
to-be-displayed region is different from the supported
colors of the electronic price tag, the to-be-displayed
region is determined as the to-be-adjusted display
region; and for each to-be-displayed region, in response
to the display colors of pixels in the to-be-displayed
region are the same as the supported colors of the
electronic price tag, the to-be-displayed region is determined as the normal display region;
determining a target color of each pixel in the to-be-adjusted display region from the supported colors of the
electronic price tag according to a display color of the
each pixel in the to-be-adjusted display region; and
generating a rendering result of the to-be-displayed information according to the target color of each pixel in the
to-be-adjusted display region and a display color of
each pixel in the normal display region, and sending the
rendering result of the to-be-displayed information to
the electronic price tag so that the electronic price tag
displays the rendering result of the to-be-displayed
information,
wherein determining the target color of the each pixel in
the to-be-adjusted display region from the supported
colors of the electronic price tag according to the
display color of the each pixel in the to-be-adjusted
display region comprises: for each pixel in the to-be-adjusted display region,
determining a similar color of the each pixel from the
supported colors of the electronic price tag according
to the display color of the each pixel;
determining a gradient color of the each pixel according to the similar color of the each pixel, display
colors of adjacent pixels of the each pixel and similar
colors of the adjacent pixels; and
determining the target color of the each pixel from the
supported colors of the electronic price tag according
to the gradient color of the each pixel.

15. The device for generating display information of an
electronic price tag according to claim 14, wherein determining the similar color of the each pixel from the supported
colors of the electronic price tag according to the display
color of the each pixel comprises:
converting the display color of the each pixel in an RGB
format into a display color in a LAB format, and
converting the supported colors in the RGB format into
supported colors in the LAB format, wherein the RGB
format is a format of an RGB color space, and the LAB
format is a format of a LAB color space;
performing color gamut separation on the supported colors obtained after a format conversion according to
A-channel pixel values and B-channel pixel values of
the supported colors obtained after the format conversion to obtain a supported color set of colors and a
supported color set of grayscales;
determining a supported color set corresponding to the
display color obtained after a format conversion
according to an A-channel pixel value and a B-channel
pixel value of the display color obtained after the
format conversion;

determining difference degrees between the display color
in the LAB format and the supported colors in the LAB
format according to a pixel value of the display color,
obtained after the format conversion, in a LAB channel
and pixel values of supported colors in the determined
supported color set in the LAB channel; and
converting a supported color in the LAB format with a
lowest difference degree into a supported color in the
RGB format, and using the obtained supported color in
the RGB format as the similar color of the each pixel.

16. A non-transitory computer-readable storage medium,
storing computer instructions configured to, when executed,
cause a processor to implement a method for generating
display information of an electronic price tag, wherein the
method for generating display information of an electronic
price tag comprises:
acquiring to-be-displayed information and supported colors of the electronic price tag, wherein the to-be-displayed information comprises a display color of
each pixel in at least one to-be-displayed region, and
each of the supported colors is a color supported and
displayed by the electronic price tag;
comparing the supported colors of the electronic price tag
with the display color of each pixel in the at least one
to-be-displayed region, and dividing the at least one
to-be-displayed region into a to-be-adjusted display
region and a normal display region according to a
comparison result, wherein for each to-be-displayed
region, in response to a display color of a pixel in the
to-be-displayed region is different from the supported
colors of the electronic price tag, the to-be-displayed
region is determined as the to-be-adjusted display
region; and for each to-be-displayed region, in response
to the display colors of pixels in the to-be-displayed
region are the same as the supported colors of the
electronic price tag, the to-be-displayed region is determined as the normal display region;
determining a target color of each pixel in the to-be-adjusted display region from the supported colors of the
electronic price tag according to a display color of the
each pixel in the to-be-adjusted display region; and
generating a rendering result of the to-be-displayed information according to the target color of each pixel in the
to-be-adjusted display region and a display color of
each pixel in the normal display region, and sending the
rendering result of the to-be-displayed information to
the electronic price tag so that the electronic price tag
displays the rendering result of the to-be-displayed
information,
wherein determining the target color of the each pixel in
the to-be-adjusted display region from the supported
colors of the electronic price tag according to the
display color of the each pixel in the to-be-adjusted
display region comprises: for each pixel in the to-be-adjusted display region,
determining a similar color of the each pixel from the
supported colors of the electronic price tag according
to the display color of the each pixel;
determining a gradient color of the each pixel according to the similar color of the each pixel, display
colors of adjacent pixels of the each pixel and similar
colors of the adjacent pixels; and
determining the target color of the each pixel from the
supported colors of the electronic price tag according
to the gradient color of the each pixel.

17. An electronic price tag, communicatively connected to the device for generating display information of an electronic price tag according to claim 14;
- wherein the electronic price tag is configured to receive a rendering result of to-be-displayed information sent by the device for generating display information of an electronic price tag; and
- the electronic price tag is configured to display the rendering result of the to-be-displayed information in at least one of: supported colors of the electronic price tag, or a mixed color consisting of the supported colors.

18. A system for displaying an electronic price tag, comprising:
- the electronic price tag according to claim 17; and
- a device for generating display information of an electronic price tag, wherein the electronic price tag is communicatively connected to the device for generating display information of an electronic price tag; and;
- wherein the device for generating display information of an electronic price tag comprises:
  - at least one processor; and
  - a memory, communicatively connected to the at least one processor;
  - wherein the memory stores a computer program executable by the at least one processor to cause the at least one processor to perform a method for generating display information of an electronic price tag; and
  - wherein the method for generating display information of an electronic price tag comprises:
    - acquiring to-be-displayed information and supported colors of the electronic price tag, wherein the to-be-displayed information comprises a display color of each pixel in at least one to-be-displayed region, and each of the supported colors is a color supported and displayed by the electronic price tag;
    - comparing the supported colors of the electronic price tag with the display color of each pixel in the at least one to-be-displayed region, and dividing the at least one to-be-displayed region into a to-be-adjusted display region and a normal display region according to a comparison result, wherein for each to-be-displayed region, in response to a display color of a pixel in the to-be-displayed region is different from the supported colors of the electronic price tag, the to-be-displayed region is determined as the to-be-adjusted display region; and for each to-be-displayed region, in response to the display colors of pixels in the to-be-displayed region are the same as the supported colors of the electronic price tag, the to-be-displayed region is determined as the normal display region;
    - determining a target color of each pixel in the to-be-adjusted display region from the supported colors of the electronic price tag according to a display color of the each pixel in the to-be-adjusted display region; and
    - generating a rendering result of the to-be-displayed information according to the target color of each pixel in the to-be-adjusted display region and a display color of each pixel in the normal display region, and sending the rendering result of the to-be-displayed information to the electronic price tag so that the electronic price tag displays the rendering result of the to-be-displayed information,
  - wherein determining the target color of the each pixel in the to-be-adjusted display region from the supported colors of the electronic price tag according to the display color of the each pixel in the to-be-adjusted display region comprises: for each pixel in the to-be-adjusted display region,
    - determining a similar color of the each pixel from the supported colors of the electronic price tag according to the display color of the each pixel;
    - determining a gradient color of the each pixel according to the similar color of the each pixel, display colors of adjacent pixels of the each pixel and similar colors of the adjacent pixels; and
    - determining the target color of the each pixel from the supported colors of the electronic price tag according to the gradient color of the each pixel.

* * * * *